United States Patent [19]

Hornung et al.

[11] Patent Number: 5,398,771
[45] Date of Patent: Mar. 21, 1995

[54] GRAIN DRILL

[75] Inventors: Donald F. Hornung, Dodge City, Kans.; J. Edson Mc Canse, Oregon, Ill.; Thomas A. Klenke, Spearville; Roger C. McDonald, Dodge City, both of Kans.

[73] Assignee: CrustBuster/Speed King, Inc., Dodge City, Kans.

[21] Appl. No.: 21,321

[22] Filed: Feb. 23, 1993

[51] Int. Cl.[6] .............................................. A01B 63/32
[52] U.S. Cl. .................... 172/311; 172/464; 172/478; 172/484; 172/575; 172/614; 172/624.5; 172/635; 172/639; 111/62; 111/164; 111/927
[58] Field of Search .............. 172/456, 310, 311, 462, 172/464, 474, 478, 574, 578, 614, 624, 625, 624.5, 629, 634, 635, 639; 111/52, 164, 927, 62, 134, 136

[56] References Cited

U.S. PATENT DOCUMENTS

| | | |
|---|---|---|
| 3,331,341 | 7/1967 | Hartwig ........................ 111/164 |
| 3,669,195 | 6/1972 | Green et al. . |
| 3,799,272 | 3/1974 | Watson . |
| 4,117,893 | 10/1978 | Kinzenbaw . |
| 4,137,852 | 2/1979 | Pratt . |
| 4,191,262 | 3/1980 | Sylvester ........................ 111/52 |
| 4,311,104 | 1/1982 | Steilen et al. ................... 111/62 |
| 4,371,039 | 2/1983 | Schaaf et al. . |
| 4,418,762 | 12/1983 | Page ............................... 172/311 |
| 4,425,857 | 1/1984 | Lienemann et al. . |
| 4,519,460 | 5/1985 | Gust . |
| 4,529,040 | 7/1985 | Grollimund . |
| 4,576,238 | 3/1986 | Spencer . |
| 4,660,651 | 4/1987 | Pfenninger et al. . |
| 4,664,202 | 5/1987 | Applequist et al. . |
| 4,700,784 | 10/1987 | Wiebe et al. . |
| 4,715,302 | 12/1987 | Briggs . |
| 4,721,168 | 1/1988 | Kinzenbaw . |
| 4,811,795 | 3/1989 | Dean et al. . |
| 4,945,997 | 8/1990 | Adee . |
| 5,024,279 | 6/1991 | Warner et al. . |
| 5,042,587 | 8/1991 | Halfmann . |
| 5,065,681 | 11/1991 | Hadley ........................... 172/464 |
| 5,163,518 | 11/1992 | Foley ............................. 172/462 |
| 5,251,704 | 10/1993 | Bourgault et al. .............. 172/311 |

OTHER PUBLICATIONS

"New for 91" 455 Folding Drill John Deere Flyer.
"Superseeders" John Deere Catalog.
"Folding No-Till Drill" Marliss Flyer.
"Solid Stand Folding Drills" Great Plains Brochure.
"5500 Folding Drill" Case International Flyer.
"Air Double-Disk Drill" Concord Flyer.

Primary Examiner—Randolph A. Reese
Assistant Examiner—Spencer Warnick
Attorney, Agent, or Firm—Stinson, Mag & Fizzell

[57] ABSTRACT

A grain drill is disclosed having a folding frame for parallel operation and a parallel link system that controls the tension to earth openers in order to produce relatively constant downward pressure for the openers. The grain drill includes a rotating tool bar for facilitating the adjustment of downward pressure to the openers, controlling the ground cutting depth of the openers and raising the tools to obtain the ground clearance needed for road transport. The drill has disc openers with axially collocated discs having different outer diameters and a narrow angle between the opener discs producing a "V" shaped groove for seeding. The grain drill has a common horizontal center to support seed boxes, fixed dual wheels and a hitch for connection to a pulling vehicle.

19 Claims, 7 Drawing Sheets

PRIOR ART

GRAIN DRILL

FIELD OF THE INVENTION

This invention relates to folding agricultural implements in general and in particular to a grain drill with adjustable ground opening tools.

BACKGROUND OF THE INVENTION

The present invention is for a new agricultural implement having two folding sections which are pivotally connected to a horizontal central support carrier section. The folding sections are movable from an unfolded, working position that extends the folding sections laterally outwardly and parallel to the horizontal central support carrier section. The folding sections can be swung to a folded position that reduces the width of the grain drill for easy transport.

Agricultural implements that are foldable are widely used and known in the prior art. The prior art agricultural implements have tool bars that do not rotate to collectively adjust the planting depth for the openers. Instead, the planting depth must be adjusted individually for each opener. Further, the prior art implements that have openers often use two disc blades of the same diameter which are sometimes mounted with one blade ahead of the other so that the front blade cuts the trash and the back blade opens the side of the furrow in the ground. This style of mounting the blades of the openers causes problems. One problem is that since the blades are mounted on different centers, as they rotate the rear blade will wear the edge of the front blade. This prevents good soil to seed contact because of a resulting defective groove. In these situations, the seed may merely be compacted into the soil by the implement press wheel without obtaining sufficient side to side soil contact.

The present invention avoids the problem of poor soil to seed contact by mounting different diameter sized blades on a common center. The larger disc blade cuts the trash ahead of the smaller disc blade which opens the furrow. Since the blades have a common center, there is no tendency to wear an edge on the front blade. Further, the groove in the soil cut by these blades is narrower, resulting in a V-shaped groove that provides for better seed to soil contact. This promotes quicker and better seed germination.

Many prior disc openers have not provided an optimal seed furrow or trench for most effective germination. The angle of opening, the width of the resulting groove, and the force required to push the disc opener in the soil and then wedge the blades apart as they rotate to create the seed groove are all affected by the angle of entry into the soil. Prior art openers with bevels directed outwardly have a relatively steep angle of approximately 20° that must be wedged into the soil. As the opposing angle blades rotate, they are forced to slide away from each other, creating a wide groove. This sliding action in conjunction with the outside disc blade bevel causes the discs to be forced upwardly. This results in greater compaction in the seed furrow and requires a greater opposing force to maintain the opener at the desired furrow depth.

The prior art implements in a so-called no-till ground condition are made to be able to apply a significant amount of down pressure per opener to be able to force the opener through the hardened earth. A no-till ground condition is one where the ground surface has not been tilled and the farm operator attempts to control weed and crop growth by applying chemicals, thereby conserving moisture and lessening the amount of wind and water erosion that can take place on the soil. For example, the John Deere 15 foot wide grain drill unit, Model 515, has 22 openers. To be able to apply a high amount of down pressure per opener requires that the unit itself must have this weight on the unit to be able to force the opener into the ground. Currently, the drill units in the industry lift the whole unit in and out of the ground for transport. This means that the seed boxes, the frame and the openers are all lifted together out of the ground. Thus, the prior art implements would have a very high amount of dead weight structure that must be lifted out of the ground. This in turn requires the unit to have heavy structural members and hydraulic cylinders to be able to do this lifting task. This necessitates the use of large tractors with sufficiently large amounts of available high horsepower hydraulic power capability.

The present invention avoids the need to lift the whole frame and seed boxes by having a rotating tool bar that only lifts the openers out of the ground and provides for easy transport. The frame and the seed boxes stay in a static position. Thus, the design and weight of the present invention precludes the need for a heavy structure for lifting the whole frame, seed boxes and openers out of the ground and also very heavy complex and expensive joints for use in the folding and flexing action.

The present invention also includes a rotating tool bar that provides depth adjustment to all the openers simultaneously, although the openers still have individual adjustment mechanisms. The rotating tool bar is connected to a parallel link system that exerts a constant down pressure upon each opener. The rotating tool bar is connected to one or more pressurized cylinders that raise the openers for ground clearance and provide for the depth adjustment for the openers. The present invention uses only one folding pressurized cylinder versus the conventional two cylinders, thereby further reducing the weight and cost of the unit. The rotating tool bar and all of its attached linkage assemblies and tillage tools operate and rotate independently of the implement main frame, thereby significantly reducing the weight lifting requirements of the machine and reducing the need to lift heavy structural members out of soil contact.

SUMMARY OF THE INVENTION

The present invention relates to a grain drill having a horizontal center carrier having two folding wing sections that are pivotally connected and when unfolded provide parallel operation. The folding sections are movable from an unfolded, working position that extends the folding sections laterally outwardly and parallel to the horizontal central support carrier section. The folding sections can be moved to a folded position, thereby reducing the width of the grain drill for easy transport. The present invention further includes a rotating tool bar that adjusts the ground opening depth of the openers, provides constant pressure to the openers, and raises the openers when the grain drill is ready for transport.

Thus, it is an object of the invention to provide a grain drill. It is a further object of the present invention to provide a grain drill which weighs less and is foldable for transportation. Another object of the invention is to provide a grain drill with a rotating tool bar that simultaneously adjusts the ground opening depth of the openers, raises the openers for transportation, and provides for constant pressure to the openers during operation. Still another object of the present invention is to provide a grain drill with a parallel link system that facilitates the adjustment of pressure to the openers. A further object of the present invention is to provide a grain drill that has different diameter sized blades on a common center which produce a groove cut that is narrower, resulting in a V-shaped groove that provides for better seed to soil contact, less compaction in the sides of the seed groove and considerably less force to hold the disc at the desired planting depth.

Other objects and advantages of this invention will become apparent after considering the following disclosure.

DESCRIPTION OF THE PREFERRED EMBODIMENT

As required, a detailed embodiment of the present invention is disclosed herein. It is, however, to be understood that the disclosed embodiment is merely illustrative of the invention, which may be embodied in various forms. Therefore, specific structural and functional details disclosed herein are not to be interpreted as limiting, but merely as providing the proper basis for the claims and as a representative basis for teaching one skilled in the art to employ the present invention.

Figure 1:
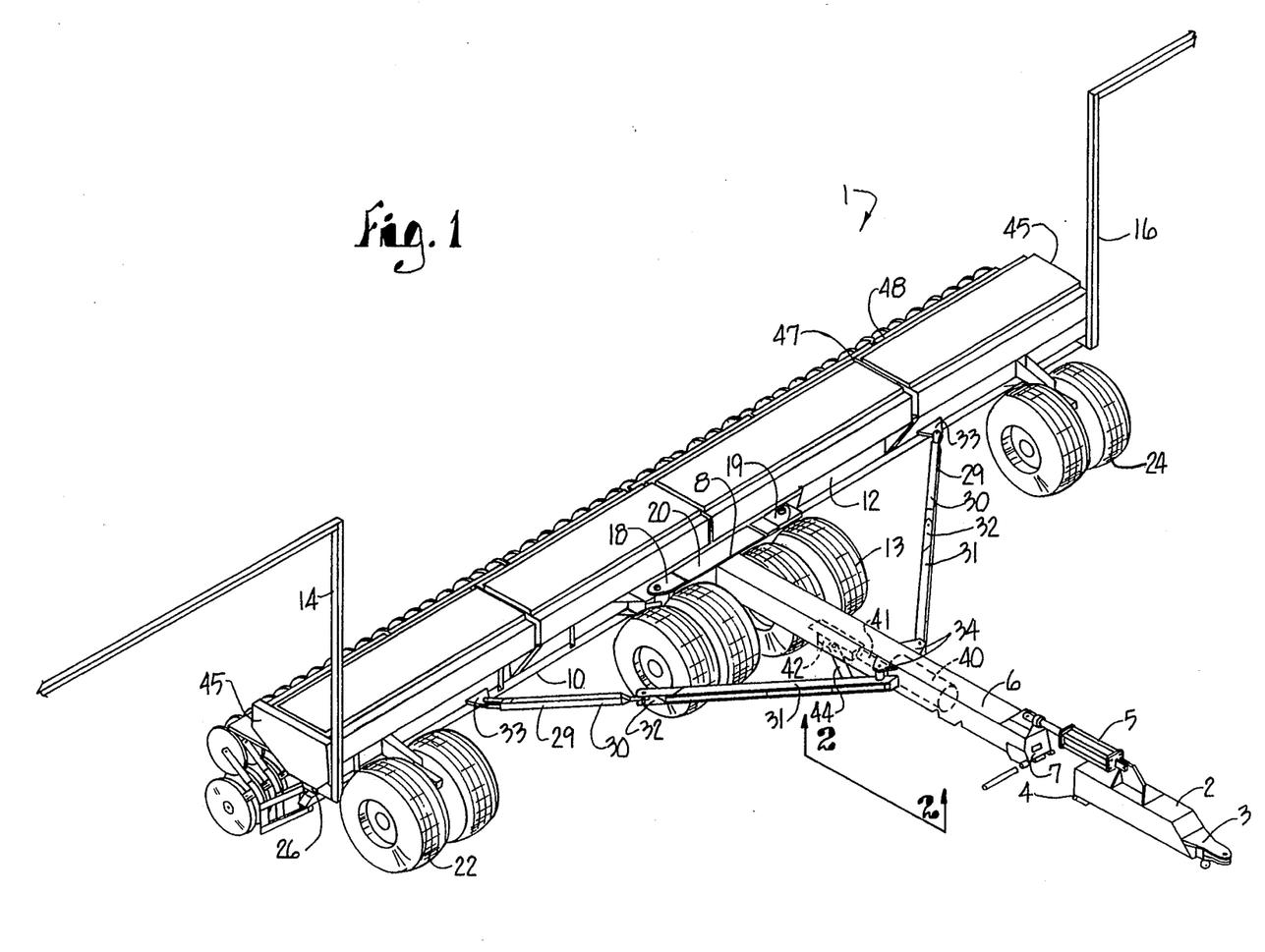
FIG. 1 is a perspective view of the grain drill with wings extended and the tool bar rotated so that the disc openers are raised out of the ground with the press wheels extending upward above the discs.

FIG. 1, numeral 1 is directed to a grain drill implement, commonly simply called a grain drill. The grain drill 1 is for connection to a prime mover vehicle (not shown), such as a tractor, through a multi-section tongue or a draw bar 2 having a tractor coupler end 3 and a connection end 4 attached to an elongate main support bar 6. The connection end 4 has a hydraulic cylinder 5 over it for adjusting downward pressure relative to the draw bar 2. This also allows the draw bar 2 to be straight with respect to the main support bar 6 while using the drill 1 and while swinging the wing sections forwardly to a transport position. After the wings are swept forwardly, the cylinder 5 is extended to cause the wing outer road wheels to lift up and out of rolling contact. The main support bar 6 has a connection end 7 and a support end 8. The pulling vehicle (not shown) is coupled to the draw bar 2 at the coupler end 3. Alternatively, the main support bar 6 can be connected to a hitch support bar (not shown) that supports the grain drill 1 when the implement is to be stored and not pulled by a vehicle. In other embodiments, the drill 1 may include attachment points for connection directly to the three point hitch of a tractor.

TOOL BAR SECTIONS

The grain drill 1 includes first and second tool bar wing sections 10 and 12 that are connected to and supported by the main support bar 6. The main support bar 6 has a main wheel set 13 that supports the entire grain drill 1 while in the folded position. The first and second tool bar sections 10 and 12 have end of row markers 14 and 16, respectively.

As best seen in FIG. 1, the grain drill 1 is shown in the unfolded position, with the first and second tool bar sections 10 and 12 in extended working positions but with the disc openers and press wheels rotated up and out of the ground. The first and second tool bar sections 10 and 12 are pinned to the main support bar 6 at hinges 18 and 19, respectively. The hinges 18 and 19 are located at opposite ends of horizontal transverse frame 20 that is fixed to the support end 8 of the main support bar 6. In the illustrated example, the horizontal frame 20 has a length that is less than 14 feet. When the first and second tool bar sections 10 and 12 are in the retracted, folded position, the grain drill 1 has a total transport width of 14¼ feet.

Figure 3:
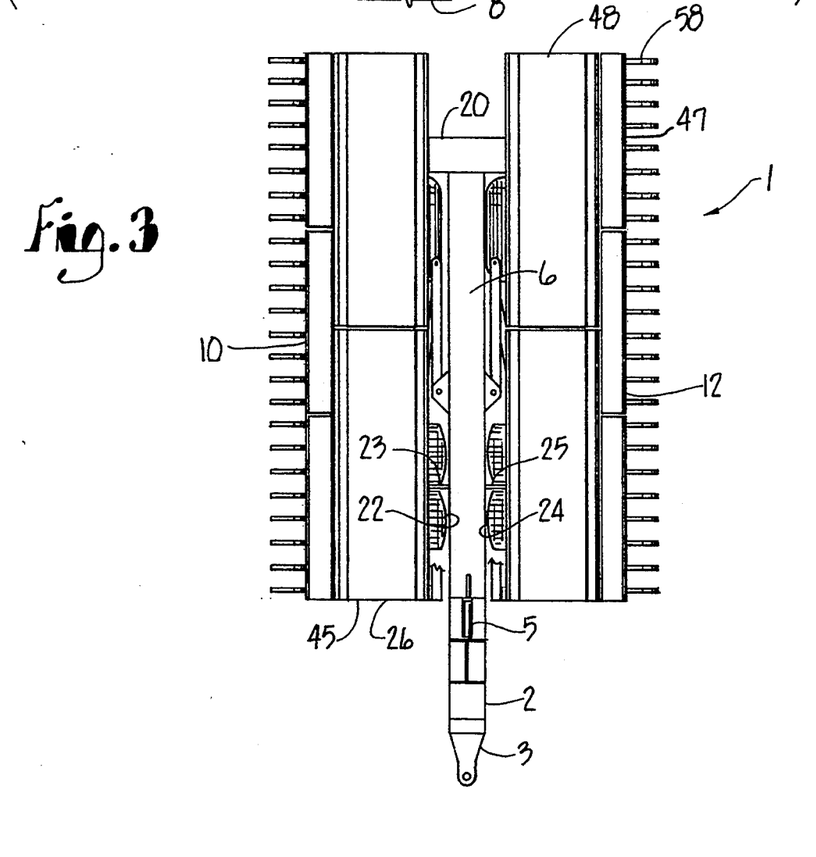
FIG. 3 is a top plan view of the grain drill showing the wing sections retracted.

Referring to FIG. 3, the grain drill is shown in the retracted, folded position. The first tool bar section has opposed wheels 22 and a securing latch 23 to engage the main support bar 6. The second tool bar section 12 has opposed support wheels 24 and a securing latch 25 that also engages the main support bar 6.

Latches 23 and 25 are evenly spaced from the opposed support wheels 22 and 24, respectively, and ensure that the first and second tool bar sections 10 and 12 are securely attached to the main support bar 6 when the grain drill 1 is in the folded position.

Figure 4:
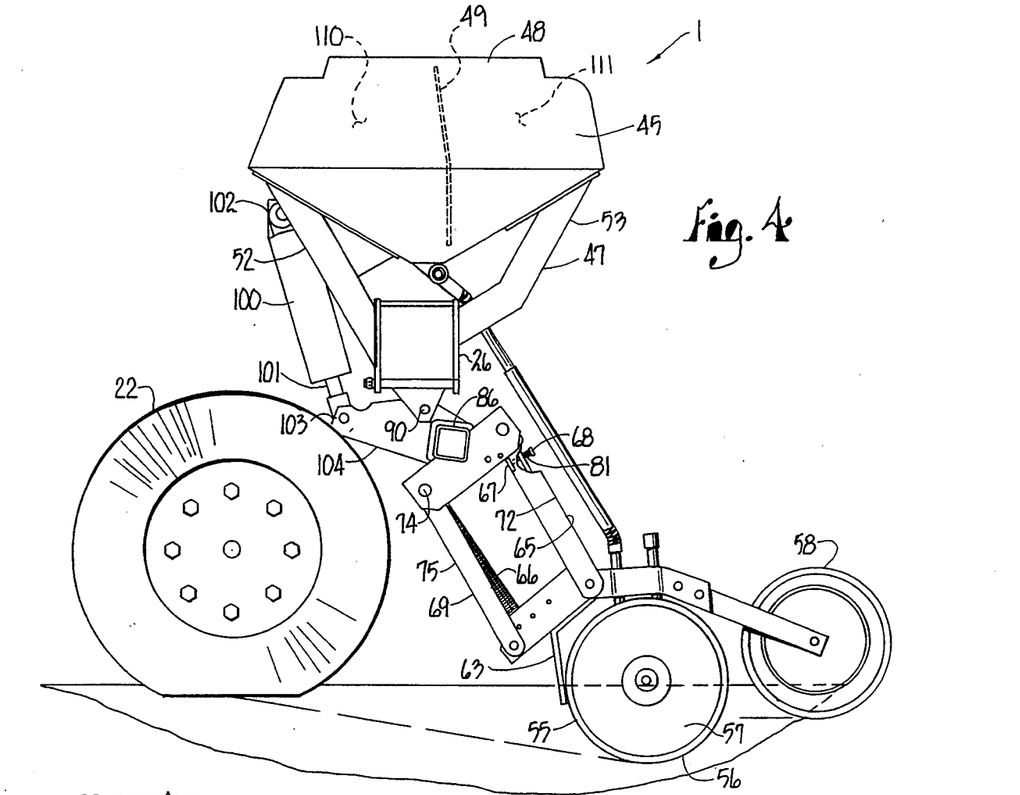
FIG. 4 is a fragmentary, side elevational view of the grain drill, with the drill disc openers and the press wheels in the lowered position and traveling through seed grooves in the soil made by the disc openers.
Figure 5:
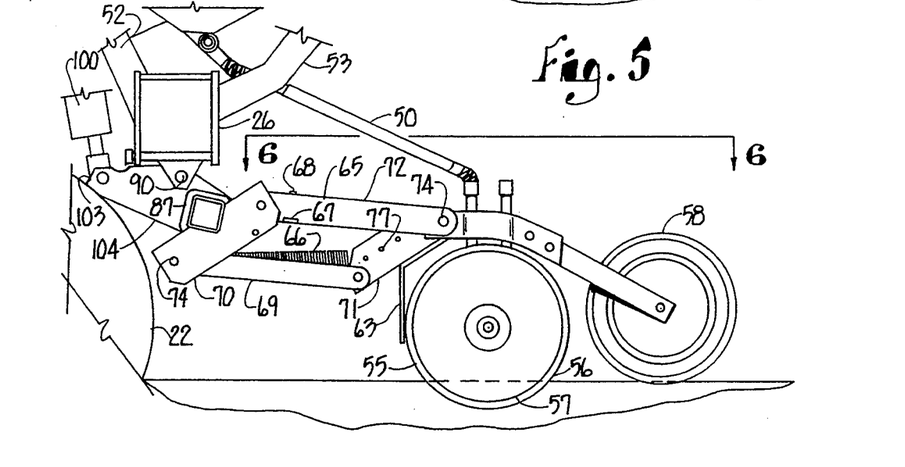
FIG. 5 is a fragmentary, side elevational view of the disc openers of the grain drill making shallow seed grooves in the soil and the press wheels following there behind. The machine has been adjusted to provide a shallower seed groove than that shown in FIG. 4.

Referring to FIGS. 1, 3 and 4, the first tool bar section 10 extends perpendicularly from the main support bar 6. The second tool bar section 12 extends perpendicularly from the main support bar 6 in an opposite direction from the first tool bar section 10. The first and second tool bar sections 10 and 12, and the horizontal frame 20 include a main frame 26. The main frame 26 is a non-rotational fixed elongated frame that connects the drilling tools (to be discussed later) to the tool bar sections 10 and 12.

FOLDING BAR SECTIONS

The first and second tool bar sections 10 and 12 are also connected to the main support bar 6 through folding bars 29 which have first and second folding bar sections 30 and 31 that are interconnected at intermediate hinges 32. The first folding bar sections 30 are connected to the first and second tool bar sections 10 and 12 at hinges 33. The hinges 33 are located near the opposed support wheels 22 and 24. The second folding bar sections 31 are connected to the main support bar 6 at hinges 34. The hinges 34 are located near the connection end 7 on the sides of the main support bar 6.

Figure 2:
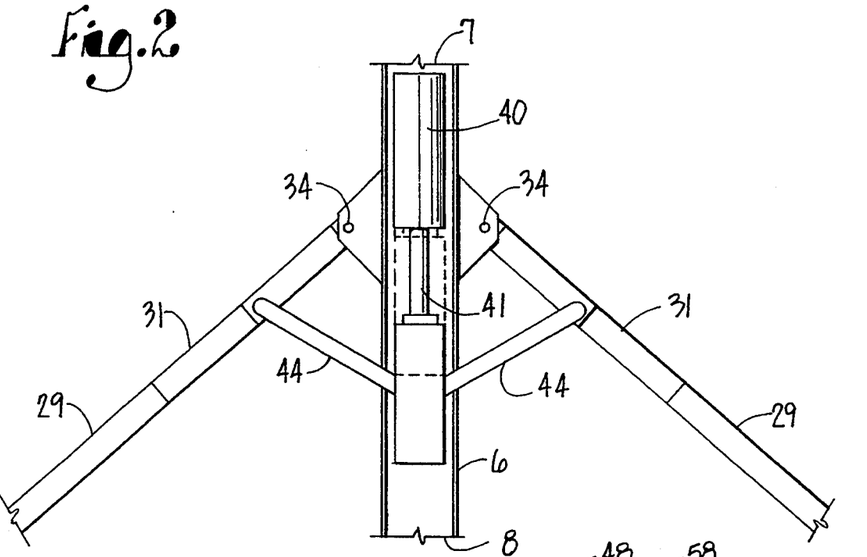
FIG. 2 is a bottom plan view of the underside of the grain drill showing a hydraulic cylinder which extends and retracts the first and second tool bar wing sections.

As best shown in FIGS. 1 and 2, the main support bar 6 has a single hydraulic cylinder 40 that is mounted on the underside of the main support bar 6. The hydraulic cylinder 40 has a piston 41 connected to a sliding rod 42 which is pivotally connected to the folding bars 29 through two opposite facing slide braces 44 fastened at 45 degree angles to the second folding bar sections 31. When the operator of the pulling vehicle (not shown) desires to extend the grain drill 1 wing sections, the operator actuates the hydraulic cylinder 40 which retracts piston 41. As the piston 41 is retracted, the sliding rod 42 is pulled towards the connection end 7 of the main support bar 6, which causes the second folding bar sections 31 to swing outwardly away from main support bar 6 about the hinges 34. The folding bars 29 then swing outwardly at the intermediate hinges 32, which causes the first and second folding bar sections 30 and 31 to become fully extended. The exemplary grain drill 1 in the extended working position has a maximum width of thirty feet.

As best shown in FIG. 3, the grain drill 1 is shown in the retracted position. When the operator of the pulling vehicle (not shown) desires to have the grain drill 1 in the retracted position, which enables the operator to pull the grain drill 1 along a narrow road, the operator actuates the hydraulic cylinder 40 to retract the first and second tool bar sections 10 and 12. The hydraulic cylinder 40 extends the piston 41 to push the sliding rod 42 away from the connection end 7 towards the support end 8 of the main support bar 6. The movement of the sliding rod 42 causes slide braces 44 to move inwardly toward the support end 8. The slide braces 44 pull the second folding bar sections 31 inwardly, causing the folding bars 29 to fold at the intermediate hinge 32. The first folding bar sections 30 swing inward towards connection end 7 of the main support bar 6, causing the first and second tool bar sections 10 and 12 to move into the retracted position.

TOOLS AND CONNECTIONS TO THE TOOL BAR SECTIONS

Figure 7:
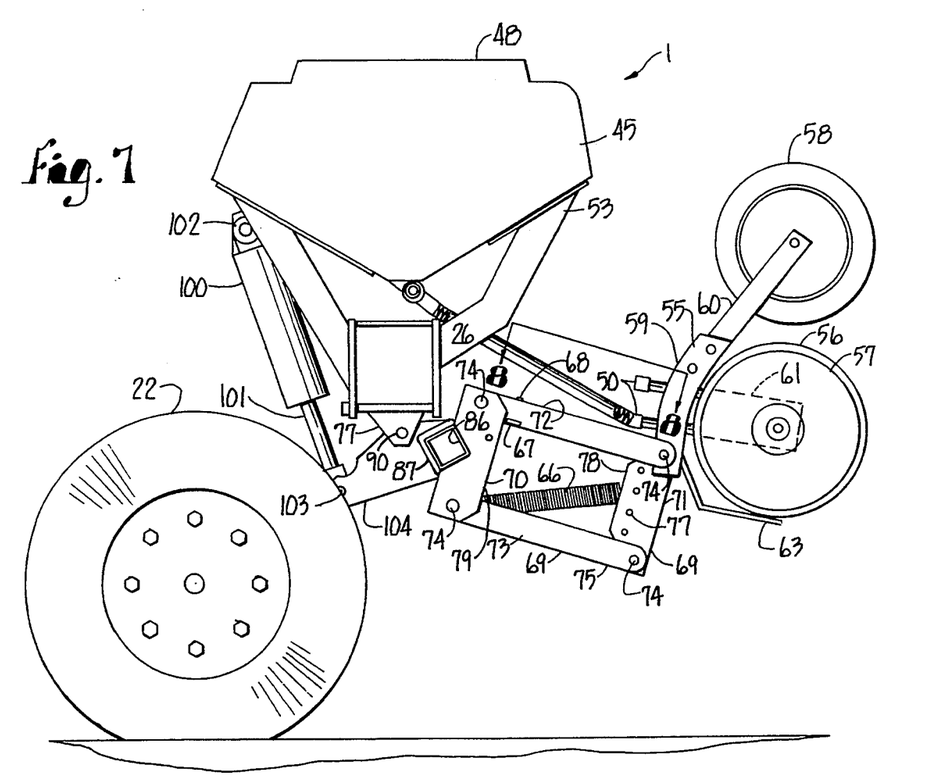
FIG. 7 is a side elevational view of the grain drill with the rotating tool bar in the lifted position, raising the drill disc openers and press wheels from the soil.

Referring to FIGS. 1, 4 and 7, the first and second tool bar sections 10 and 12 are shown in the extended position and are substantially identical. The grain drill 1, when in the extended position, has an approximate width of 30 feet. The first and second tool bar sections 10 and 12 each have ends 45, working sides 47, supply hoppers 48 that have dividers 49 that produce large and small interior compartments 110 and 111, hopper feed tubes 50, disc openers 55, parallel linkage systems 65 and rotating tool bars 86. The supply hoppers 48 (commonly termed seed boxes) are attached to the main frame 26 by support braces 52 and 53. The large and small interior compartments of the supply hoppers 48 have a shut off system (not shown) which shuts off the delivery of the seed or other material in the supply hoppers 48. In the exemplary implement, the large compartment of each of the supply hoppers 48 has a $2\frac{1}{2}$ bushel capacity per running foot. The hopper feed tubes 50 are connected to the supply hoppers 48 and provide a path for seed or other material to travel from the supply hoppers 48 to the openers 55. The parallel linkage systems 65 are securely attached to the rotating tool bars 86 on working sides 47. The rotating tool bars 86 are pivotally connected to the underside of main frame 26 at hinges 90. The openers 55 are connected to the rotating tool bars 86 through the parallel linkage systems 65.

The first and second tool bar sections 10 and 12 each have pressurized cylinders 100, such as located near the ends 45, that have pistons 101. The pressurized cylinders 100 are attached to the first and second tool bar sections 10 and 12 through top and bottom connections 102 and 103. The pressurized cylinders 100 have electrical and hydraulic connections (not shown) that provide for independent operation. The independent operation of the pressurized cylinders allows the operator of the grain drill 1 to operate the first tool bar 10 without operating the second tool bar section 12, and vice-versa.

The top connections 102 are connected to the top end of support braces 52. Bottom connections 103, which are located at the end of pistons 101, are connected to the leverage arms 104 that are secured to rotating tool bars 86. The leverage arms 104 and the rotating tool bars 86 are pivotally connected to the main frame 26 at hinges 90.

THE ROTATING TOOL BAR

As shown in FIG. 7, when the operator of the pulling vehicle desires to raise the openers 55 from the ground surface, he actuates the pressurized cylinders 100. Actuation of the pressurized cylinders 100 causes the pistons 101 to extend from the cylinders 100, causing the leverage arms 104 to rotate counterclockwise about the hinges 90 and swing the rotating tool bar 86 upwardly. The rotating tool bars 86, as they are rotated counterclockwise, raise the parallel linkage systems 65 and the openers 55 above the ground surface. When the operator of the pulling vehicle desires to lower the openers 55, he actuates the pressurized cylinders 100 to retract the pistons 101. As the pistons 101 are retracted, the leverage arms 104 are pulled toward the pressurized cylinders 100, causing the rotating tool bars 86 to rotate clockwise about the hinges 90 and lower the openers 55 toward the ground surface. As the tool bar attempts to swing the parallel linkage mechanism 65 and the attached press wheel, the rotating tool bar 86 preferably has up to 45 degrees of rotation, providing for increased ground clearance for transport along roadways. The rotation of the rotating tool bar 86 also provides adjustment of the ground opening depth of the openers 55. The rotating tool bar 86 is able to provide up to 14 inches of operating range as the openers 55 rotate on the ground. By actuating the pressurized cylinders 100, the operator is able to increase or decrease the depth adjustment of the openers 55.

THE NON-ROTATIONAL MAIN FRAME

As shown in FIGS. 1, 3, 4 and 7, the main frame 26 is connected to the first and second tool bar sections 10 and 12, and the horizontal frame 20. The main frame 26 is not rotated or moved as the pressurized cylinders 100 are actuated. The rotating tool bar 86 raises and lowers the openers 55. The stationary feature of the main frame 26 allows the grain drill 1 not to require a heavy support structure, unlike conventional grain drills which must lift the main frame 26 and the supply hoppers 48 when the openers 55 are being raised off the ground. The design and weight of the grain drill 1 is less than prior art competitors because pressurized cylinders 100 are only needed to lift the openers and not the main frame 26 and the supply hoppers 48. The grain drill 1 with 30 openers 55 weighs approximately 13,000 pounds when the supply hoppers 48 are full. When the supply hoppers 48 are empty, the grain drill 1 with 30 openers has an approximate transport weight of 8,000 pounds.

PARALLEL LINKAGE SYSTEMS

Figure 6:
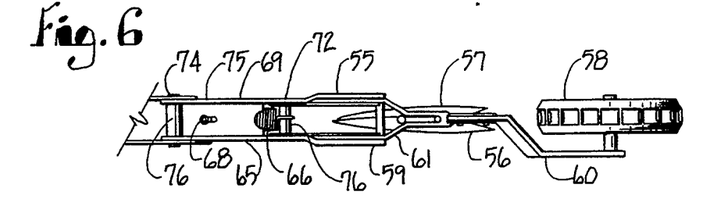
FIG. 6 is a sectional view of the drill disc openers, press wheels and parallel linkage system taken along lines 6—6 of FIG. 5.
Figure 8:
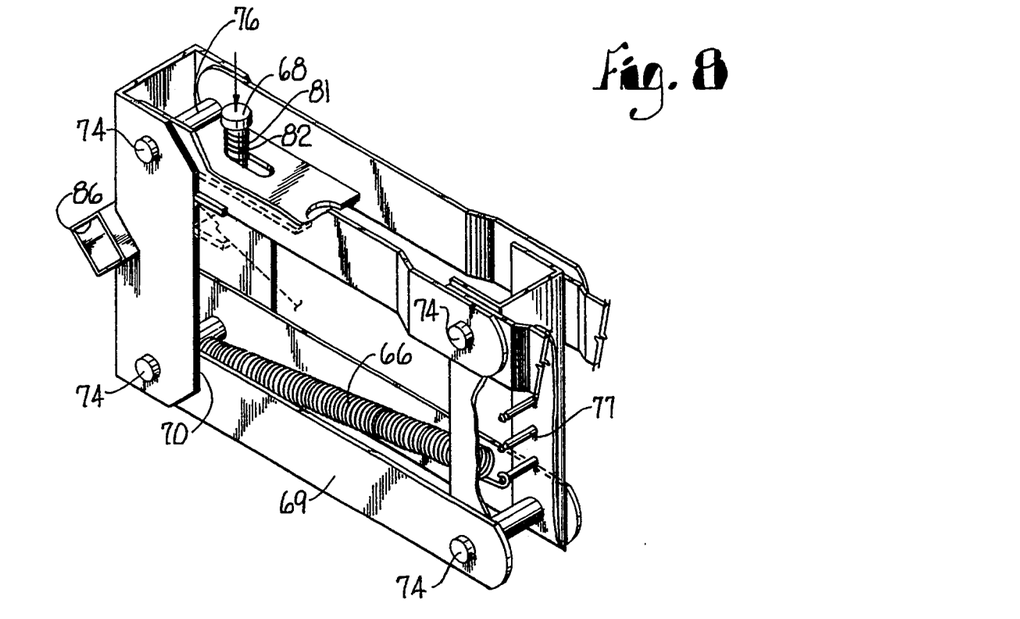
FIG. 8 is a sectional view of the parallel linkage system taken along lines 8—8 of FIG. 7.

As shown in FIGS. 4, 6 and 8, each exemplary parallel linkage system 65 provides a 60 degree downward angle at the bottom of travel and includes a tension spring 66, a detent latch 67, a latch release 68, and a plurality of parallel bars 69. The parallel bars 69 include opposite facing side bars 70 and 71, and two identical top and bottom opposite facing bars 72 and 73. The top and bottom opposite facing bars 72 and 73 are of equal length and have a length that is greater than the length of opposite facing side bars 70 and 71, which are of equal length. The parallel bars 69 are connected at their respective ends at hinges 74 to form a parallelogram 75 that has the top and bottom opposite facing sides 72 and 73 evenly spaced apart through four spacing pivot bars 76 of equal length. The side opposite facing bar 70 is connected to the rotating tool bar 86 through a brace 87. The side opposite facing bar 71 and the two top opposite facing bars 72 are connected to the openers 55 at the top left hinge 74. A brace 87 is positioned over the rotating tool bar 86 and bolted to the midsection of side opposite facing bar 70. Actuation of the pressurized cylinders 100 causes the pistons 101 to retract or extend, which drives the leverage arms 104 to rotate the rotating tool bars 86. Rotation of the rotating tool bar 86 causes the side opposite facing bar 70 to swing upward or downward, which raises or lowers the parallel linkage systems 65 and the openers 55.

The side opposite facing bar 71 includes a plurality of evenly spaced supports 77. The tension spring 66 has a connection end 78 and a fixed end 79. The connection end 78 can be moved and hooked to any one of the evenly spaced supports 77. The fixed end 79 of the tension spring 66 is secured to the side opposite facing bar 70 at the bottom left hinge 74.

The tension spring 66 provides a down force pressure to the parallel linkage system 65 which causes the openers 55 to have a constant down force pressure against the ground surface for tilling the soil. To change the down force pressure from the tension spring 66, the operator must change the location of the end 78 of the tension spring 66 to a different support 77. To do this, the operator pushes down on the latch release 68 which allows the parallelogram 75 to collapse so that the operator can change the location of the end 78 of the tension spring 66.

The latch release 68, which is an elongated bar having a narrow shaft 80 and a spring 81, is connected to and integral with the detent latch 67. Top opposite facing bars 72 have a square cutout 82 that is located on the underside face of top opposite facing bars 72. This detent latch 67 is biased into and against the surfaces of the cutout 82 such that the sides of the detent latch 67 extend slightly beyond the sides of the cutout 82.

When the detent latch 67 is biased into the cutout 82, the detent latch 67 keeps the parallel bars 69 from collapsing under the downward force from the tension spring 66. When the operator pushes down on the latch release 68, the spring 81 is compressed and the shaft 80 is pushed downward, causing the detent latch 67 to move away and out from the cutout 82. As the detent latch 67 is moved away from the cutout 82, the downward force from the tension spring causes the parallel bars 69 to collapse, causing the top opposite facing bars 72 to move towards the bottom opposite facing bars 73. When the parallel bars 69 collapse, the operator is able to move the end 78 of the tension spring 66 to a different support 77. By releasing the detent release 68 and pulling the top opposite facing bars 72 away from the bottom opposite facing bars 73, the operator allows the detent latch 67 to move into the cutout 82, causing the parallel bars 69 to once again form a fixed parallelogram 75.

THE OPENERS

As shown in FIGS. 4, 5, 6 and 7, the openers 55 each have a large diameter disc drill 56 having an approximate 15¼ inch blade, a small diameter disc drill 57 having an approximate 13½ inch blade, press and gauge wheels 58, support braces 59, arm supports 60, drill arm supports 61 and rock and dirt guards 63. The press and gauge wheels 58 are connected to the parallel linkage system 65 through the arm supports 60 and bolt attachments. The press and gauge wheels 58 can be of various sizes and can be easily removed and reinstalled.

Figure 9:
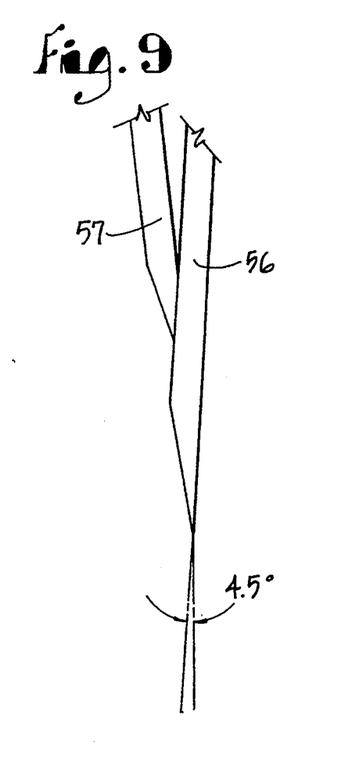
FIG. 9 is a sectional view of the drill disc openers taken along lines 9—9 of FIG. 11.
Figure 10:
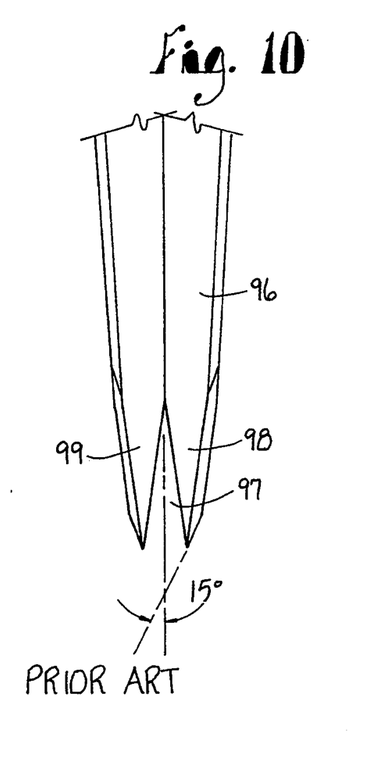
FIG. 10 is a sectional view of conventional or prior art drill disc openers.
Figure 11:
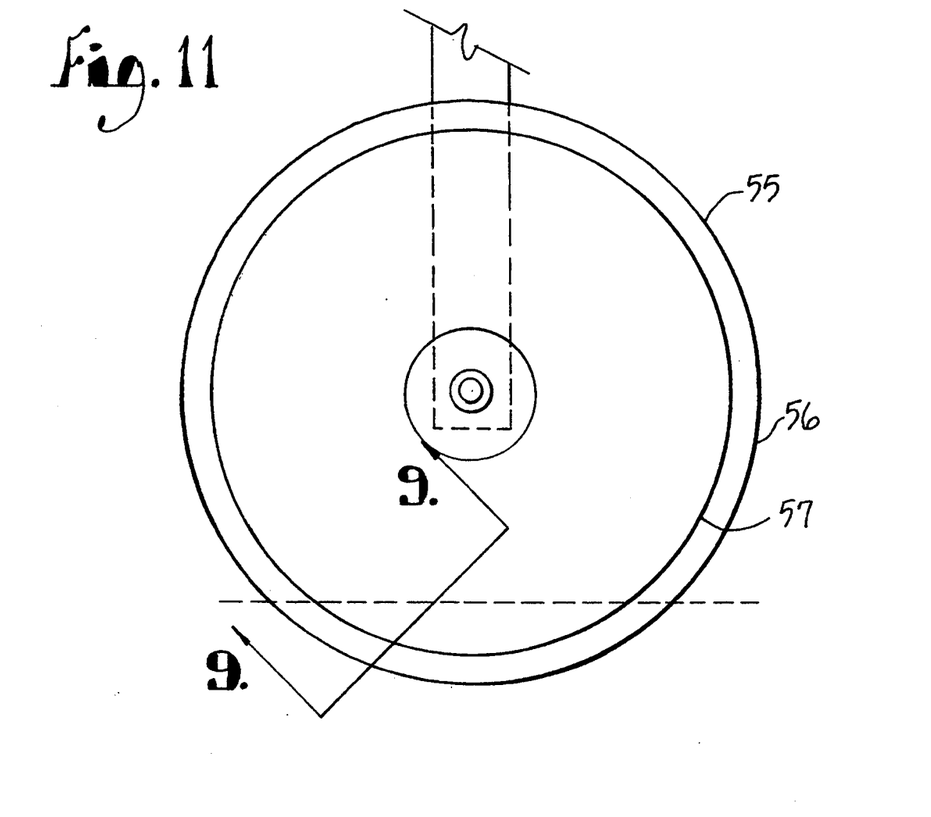
FIG. 11 is a fragmentary, side elevational view of the grain drill disc openers.

The large and small diameter disc drills 56 and 57 are concentrically connected side by side to the drill arm supports 61. As shown in FIGS. 9, 11 12 and 14, the drills 56 and 57 are positioned to form a narrow angle that allows the drills 56 and 57 to produce a stepped "V" shaped groove 95 in the soil for seeding or fertilizing. The use of the concentrically located large and small diameter drills 56 and 57 provides for a sharper knife cutting action, when compared to two blades of equal diameter 96, as shown in FIG. 10, such as the prior art blade concept with blades having 13½ inch outer diameters. The blades 56 and 57 are positioned close together, providing for a narrow distance between the blades, such that the blades 56 and 57 actually support each other and provide for an approximate 4½° angle of entry into the soil.

Figure 13:
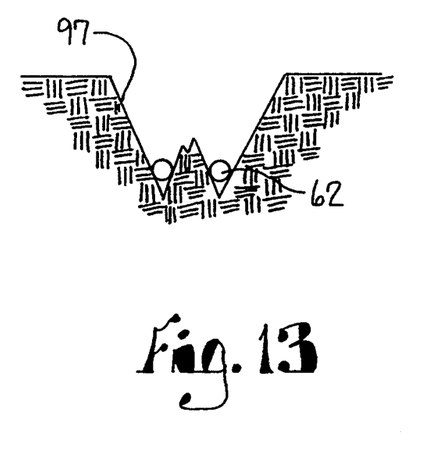
FIG. 13 is a sectional view of a trench shape in the ground created by a grain drill having dual disc drills having equal diameters.

Referring to FIGS. 10 and 13, the prior art dual blades 96 include blades which are not concentrically located and that produce a "W" shaped groove 97. The prior art dual blades 96 have a leading blade 98 and a following blade 99 of equal diameter that provide for an approximate 15° angle of entry into the soil. The leading blade 98 cuts most of the ground trash. The following blade 99 tends to wear out the leading blade 98, such that the prior art dual blades 96 requires unduly sturdily constructed blades. As shown in FIG. 9, in the present invention, the blades 56 and 57 do not require heavily formed blades or need specially manufactured bearings. Because the blades 56 and 57 are concentrically located, there is no following blade that could cause wear to a leading blade.

Figure 12:
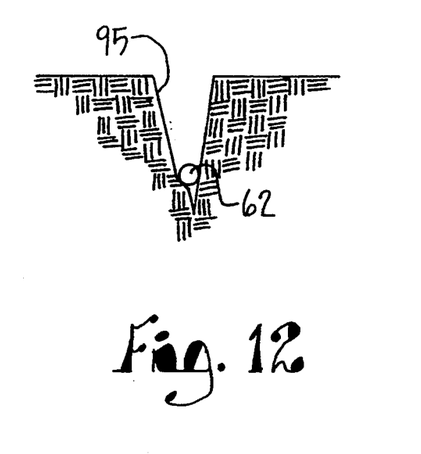
FIG. 12 is a sectional view of a trench shape in the ground created by a grain drill having disc openers with different outer diameters.

As shown in FIG. 12, the drills 56 and 57 create a trench shape in the ground that has sides which are close together providing for the tight placement of the seed 62. Referring to FIG. 13, a trench shape is disclosed which was created by drills having equal diameter. The resulting trench shape is much wider and fails to provide for tight placement of the seed 62.

Figure 14:
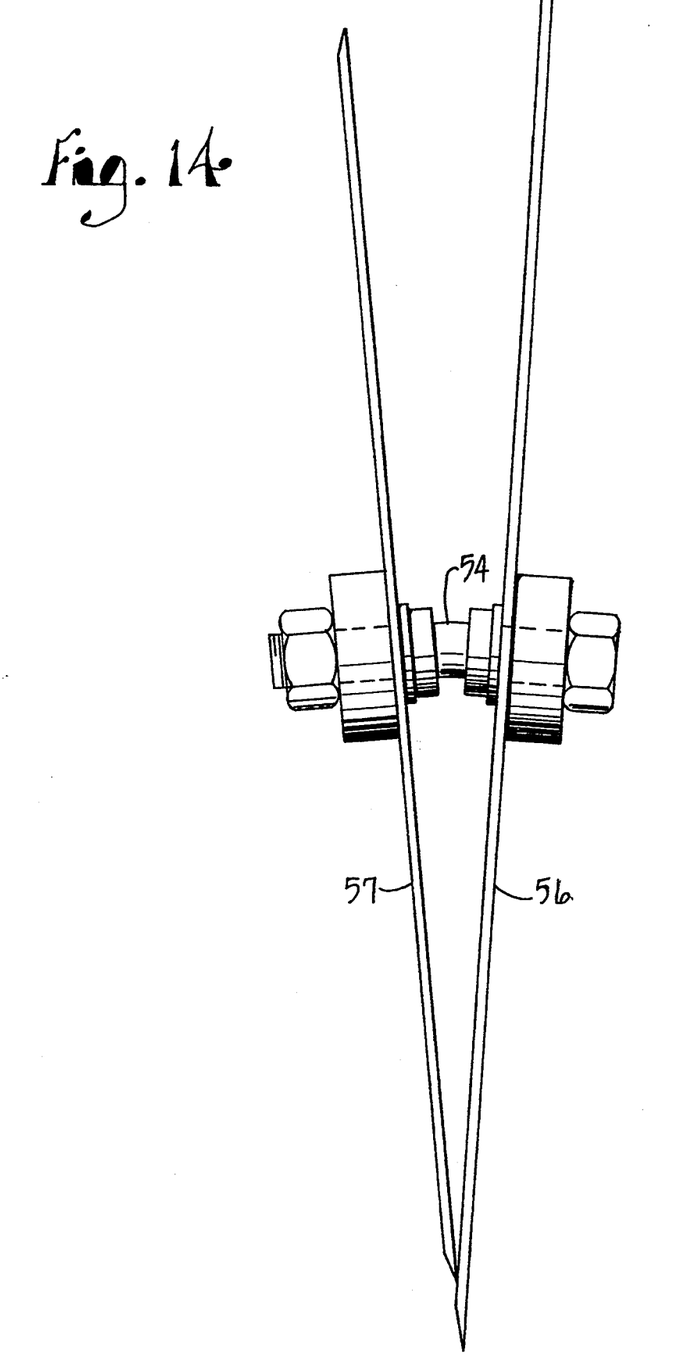
FIG. 14 is a top plan view of the disc openers of the present invention.

The disc blades 56 and 57 are mounted on a common axle shaft 54, which is preferably angled, as shown in FIG. 14, to accommodate the angular relationship of the blades 56 and 57. Further, the blade 57 has an edge bevel angled inwardly toward the larger diameter blade 56 for smooth running in the soil and cutting through surface vegetation and other so-called "trash."

SUMMARY

The present invention is directed to a grain drill 1 having a main support bar 6 and first and second tool bar sections 10 and 12, each having a non-rotational main frame 26 and a rotating tool bar 86. The main support bar 6 connects the grain drill 1 to a pulling vehicle (not shown). The rotating tool bars 86 are pivotally connected to the underside of the main frame 26 about the hinges 90 and to the pressurized cylinders 100. Each rotating tool bar 86 includes a plurality of parallel linkage systems 65 and openers 55. When it is desired to raise the parallel linkage systems 65 and openers 55 from the ground, the pressurized cylinders 100 are actuated. Upon actuation, the pressurized cylinders 100 extend the pistons 101 which rotate the rotating tool bar 86 about the hinges 90 in a counter clockwise direction. This rotation of the rotating tool bar 86 drives the side opposite facing bar 70 of the parallel linkage systems 65 to swing upward, which raises the parallel linkage system 65 and the openers 55 above the ground surface. To lower the openers 55, the pressurized cylinders 100 are actuated to retract the pistons 101 which rotate the rotating tool bar 86 about the hinges 90 in the clockwise direction. This clockwise rotation lowers the parallel linkage systems 65 and the openers 55 to the ground.

The openers 55 each include a large and small diameter disc drill 56 and 57 that are concentrically located to create a "V" shaped groove 95 in the ground surface, and press and gauge wheels 58. The rotating tool bar 86 provides for a one point adjustment that can increase or decrease the depth adjustment of the openers 55.

When it is desired to move the grain drill 1 into a retracted, folded position, the hydraulic cylinder 40 is actuated, which extends the piston 41 and urges the sliding rod 42 and the slide braces 44 to move towards the support end 8 of the main support bar 6. This movement causes the folding bar sections 30 and 31 to swing inwardly and the folding bars 29 to fold about the intermediate hinges 32, which causes the first and second tool bar sections 10 and 12 to move into the retracted, folded position.

The parallel linkage systems 65 include tension springs 66 that provide a constant down force pressure for the openers 55 against the ground surface. The down force pressure can be adjusted by changing the location of the end 78 of the tension spring 66.

The above arrangement provides a tool bar which rotates independently of the implement support frame and to which a vertically adjustable linkage assembly is affixed with a plurality of tillage tools. As the tool bar is rotated, the linkage assembly and tillage tools are adjusted with respect to the field surface or even lifted out of ground contact for road travel. This independently rotatable tool bar alleviates the necessity to provide massive hydraulic structures extending between support wheels and the main frame to raise the tillage tools out of ground contact, as has often been previously done.

The necessary controls for folding and unfolding the grain drill 1 are all preferably placed with the cab of the pulling vehicle (not shown). The necessary controls and hydraulic circuitry are within the knowledge of a worker skilled in the art.

It is to be understood that while certain forms of this invention have been illustrated and described, the invention is not limited thereto, except insofar as such limitations are included in the following claims.

What is claimed and desired to be secured by Letter Patent is as follows:

1. A grain drill unit comprising:
  a) a support frame having spaced, ground engaging wheels extending therefrom for movement over a field surface, a forwardly extending connection for attachment to a towing vehicle and seed boxes attached on top of said support frame, said support frame having means for folding and unfolding said support frame;
  b) a revolving tool bar extending along said support frame and attached thereto via a controllably adjustable mechanism for independent rotational movement;
  c) a parallel link system having a plurality of parallel bars and being mounted to said revolving tool bar in a trailing position, said parallel link system having soil openers attached thereto in a trailing position and adjustable up and down therewith for selectively variable downward tillage position, said parallel link system having means for applying tension and holding relatively constant pressure on said openers throughout the entire opener range or travel, said openers including a plurality of pairs of disc blades, said pairs of disc blades including a first and second disc blade, said first disc blade having a different outer diameter from said second disc blade, said parallel link system operative to release said tension and said constant pressure for adjustment of said variable downward tillage position;
  d) said controllably adjustable mechanism acting to rotate said revolving tool bar and said parallel link system with said openers connected thereto upwardly and independently of said support frame to remove said openers from earth contact for transport of said grain drill unit between work fields, said controllably adjustable mechanism operative to adjust said tension and said constant pressure on said openers and operative to adjust ground clearance for transport of said grain drill unit; and
  e) said support frame when unfolded providing for parallel operation of said openers.

2. The grain drill unit as set forth in claim 1 wherein said parallel link system has rigidly mounted thereto, by an arm support, a plurality of press wheels for adjusting ground opening depth of said openers, said arm support attached to said parallel link system in a trailing position to said parallel link system, and said press wheels being selectively changeable to different sizes.

3. The grain drill unit as set forth in claim 2 wherein said pairs of disc blades each have a reverse bevel on one of the disc blades of each said pair, said disc blades attached to drill arm supports, said drill arm supports connected to said parallel link system in a trailing position to said parallel link system and forward of said press wheels, said pairs of disc blades operative to form a narrow angle between said disc blades of each said pair and produce a "V" shaped groove for seeding, and said controllably adjustable mechanism operative to provide up to 14 inches of operating range as said pairs of disc blades rotate on the ground.

4. The grain drill unit as set forth in claim 1 wherein said plurality of parallel bars being mounted with an approximate 60 degree downward angle at the bottom of said opener range of travel, and below a horizontally level angle at the top of the said opener range of travel.

5. The grain drill unit as set forth in claim 1 wherein said controllably adjustable mechanism includes a plurality of parallel pressure cylinders to rotate said revolving tool bar, said controllably adjustable mechanism operative to provide said revolving tool bar with up to approximately 45 degrees of rotation, causing said ground clearance to increase providing for transport clearance of said drill unit.

6. The grain drill unit as set forth in claim 1 wherein said revolving tool bar is operative to provide a one point adjustment to increase and decrease ground opening depth of said openers.

7. A grain drill unit comprising:
a) a support frame having spaced, ground engaging wheels extending therefrom for movement over a field surface, a forwardly extending connection for attachment to a towing vehicle, and seed boxes attached on top of said support frame, said support frame having means for folding and unfolding said support frame and operative for transport without need for high off the ground clearance;
b) a revolving tool bar extending along said support frame and attached thereto via a controllably adjustable mechanism for independent rotational movement;
c) a parallel link system having a plurality of parallel bars and being mounted to said revolving tool bar in a trailing position, said parallel link system having soil openers attached thereto in a trailing position and adjustable up and down therewith for selectively variable downward tillage position, said parallel link system having means for applying tension and holding relatively constant pressure on said openers throughout the entire opener range of travel, said openers including a plurality of pairs of disc blades, said pairs of disc blades including a first and second disc blade, said first disc blade having a different outer diameter from said second disc blade, said parallel link system operative to release said tension and said constant pressure for adjustment of said variable downward tillage position;
d) said controllably adjustable mechanism acting to rotate said revolving tool bar and said parallel link system with said openers connected thereto upwardly and independently of said support frame to remove said openers from earth contact for transport of said grain drill unit between work fields, said controllably adjustable mechanism operative to adjust said tension and said constant pressure on said openers for selectively controlling ground opening depth by said openers and operative to adjust ground clearance for transport of said grain drill unit;
e) said parallel link system has rigidly mounted thereto, by an arm support, a plurality of press wheels for adjusting ground opening depth, said arm support attached to said parallel link system in a trailing position to said parallel link system, said press wheels being selectively changeable to different sizes;
f) said pairs of disc blades each having a reverse bevel on one of the disc blades of each said pair, said disc blades attached to drill arm supports, said drill arm supports connected to said parallel link system in a trailing position to said parallel link system and forward of said press wheels, said pairs of disc blades operative to form a narrow angle between said disc blades of each said pair and produce a "V" shaped groove for seeding, said controllably adjustable mechanism operative to provide up to 14 inches of operating range as said pairs of disc blades rotate on the ground;
g) said plurality of parallel bars being mounted with an approximate 60 degree downward angle at the bottom of said opener range of travel, and below a horizontally level angle at the cop of the said opener range of travel; and
h) said support frame when unfolded providing for parallel operation of said openers.

8. The grain drill unit as set forth in claim 7 wherein said controllably adjustable mechanism includes a plurality of parallel pressure cylinders to rotate said revolving tool bar, said controllably adjustable mechanism operative to provide said revolving tool bar with up to approximately 45 degrees of rotation, causing said ground clearance to increase providing for transport clearance of said drill unit.

9. The grain drill unit as set forth in claim 7 wherein said seed boxes have dividers installed therein, said dividers operative for producing large and small compartments for storing seeds and fertilizers in said compartments.

10. The grain drill unit as set forth in claim 7 wherein said means for folding and unfolding said support frame includes a pressurized cylinder acting to selectively fold and unfold said support frame.

11. The grain drill unit as set forth in claim 7 wherein said controllably adjustable mechanism includes a plurality of pressurized parallel cylinders and has means for independent operation of said pressurized parallel cylinders.

12. The grain drill unit as set forth in claim 7 wherein said revolving tool bar is operative to provide a one point adjustment to increase and decrease ground opening depth of said openers.

13. The grain drill unit as set forth in claim 7 wherein said revolving tool bar is operative to rotate independently from said support frame and lift and lower said parallel link system, said openers, said press wheels and said plurality of pairs of disc blades from and onto said ground.

14. A grain drill unit comprising:
a) a support frame having spaced, ground engaging wheels extending therefrom for movement over a field surface, a forwardly extending connection for attachment to a towing vehicle and seed boxes attached on top of said support frame, said support frame having means for folding and unfolding said support frame and operative for transport without need for high off the ground clearance, said means for folding and unfolding said support frame including a pressurized cylinder acting to selectively fold and unfold said support frame, said seed boxes having said dividers installed therein, dividers operative for producing large and small compartments for storing seeds and fertilizers in said compartments;

b) a revolving tool bar extending along said support frame and attached thereto via a controllably adjustable mechanism for independent rotational movement;

c) a parallel link system having a plurality of parallel bars and being mounted to said revolving tool bar in a trailing position, said parallel line system having soil openers attached thereto in a trailing position and adjustable up and down therewith for a selectively variable downward tillage position, said parallel link system having means for applying tension and holding relatively constant pressure on said openers throughout the entire opener range of travel, said openers including a plurality of pairs of disc blades, said pairs of disc blades including a first and second disc blade, said first disc blade having a different outer diameter from said second disc blade, said parallel link system operative to release said tension and said constant pressure for adjustment of said variable downward tillage position;

d) said controllably adjustable mechanism acting to rotate said revolving tool bar and said parallel link system with said openers connected thereto upwardly and independently of said support frame to remove said openers from earth contact for transport of said grain drill unit between work fields, said controllably adjustable mechanism operative for adjusting said tension and said constant pressure on said openers for selectively controlling ground opening depth by said openers, and operative for adjusting ground clearance for transport of said grain drill unit, said controllably adjustable mechanism having a plurality of parallel pressure cylinders for rotating said revolving tool bar, and means for independent operation of said pressurized parallel cylinders, said controllably adjustable mechanism acting to provide said revolving tool bar with up to approximately 45 degrees of rotation;

e) said parallel link system has rigidly mounted thereto, by an arm support, a plurality of press wheels for adjusting ground opening depth, said arm support attached no said parallel link system in a trailing position to said parallel link system, said press wheels being selectively changeable to different sizes;

f) said pairs of disc blades each having a reverse bevel on one of the disc blades of each said pair, said disc blades attached to drill arm supports, said drill arm supports connected to said parallel link system in a trailing position to said parallel link system and forward of said press wheels, said pairs of disc blades operative to form a narrow angle between said disc blades of each said pair and produce a "V" shaped groove for seeding, said controllably adjustable mechanism operative to provide up to 14 inches of operating range as said pairs of disc blades rotate on the ground;

g) said plurality of parallel bars being mounted with an approximate 60 degree downward angle at the bottom of said opener range of travel, and below a horizontally level angle at the top of the said opener range of travel; and h) said support frame when unfolded providing for parallel operation of said openers.

15. The grain drill unit as set forth in claim 14 wherein said seed boxes are connected to feed tubes that deliver said seeds and said fertilizers to said openers.

16. The grain drill unit as set forth in claim 14 wherein said revolving tool bar is operative to provide a one point adjustment to increase and decrease ground opening depth of said openers.

17. The grain drill unit as set forth in claim 14 wherein said revolving tool bar is operative to rotate independently from said support frame and lift and lower said parallel link system, said openers, said press wheels and said plurality of disc blades from and onto said ground.

18. A grain drill unit comprising:

a) a support frame having spaced, ground engaging wheels extending therefrom for movement over a field surface, a forwardly extending connection for attachment to a towing vehicle and seed boxes attached on top of said support frame, said support frame having means for folding and unfolding said support frame and operative for transport without need for high off the ground clearance, said means for folding and unfolding said support frame including a pressurized cylinder acting to selectively fold and unfold said support frame, said seed boxes having dividers installed therein, said dividers operative for producing large and small compartments for storing seeds and fertilizers in said compartments;

b) a revolving tool bar extending along said support frame and attached thereto via a controllably adjustable mechanism for independent rotational movement;

c) a parallel link system having a plurality of parallel bars and being mounted to said revolving tool bar in a trailing position, said parallel link system having soil openers attached thereto in a trailing position and adjustable up and down therewith for a selectively variable downward tillage position, said parallel link system having means for applying tension and holding relatively constant pressure on said openers throughout the entire opener range of travel, said openers including a plurality of pairs of disc blades, said pairs of disc blades including a first and second disc blade, said first disc blade having a different outer diameter from said second disc blade, said parallel link system operative to release said tension and said constant pressure for adjustment of said variable downward fillage position;

d) said controllably adjustable mechanism acting to rotate said revolving tool bar and said parallel link system with said openers connected thereto upwardly and independently of said support frame to remove said openers from earth contact for transport of said grain drill between work fields, said controllably adjustable mechanism operative for adjusting said tension and said constant pressure on said openers for selectively controlling ground opening depth by said openers, and operative for adjusting ground clearance for transport of said grain drill unit, said controllably adjustable mechanism having a plurality of parallel pressure cylinders for rotating said revolving tool bar, and means for independent operation of said pressurized parallel cylinders, said controllably adjustable mechanism acting to provide said revolving tool bar with up to approximately 45 degrees of rotation, causing said ground clearance to increase providing for transport clearance of said drill unit;

e) said parallel link system has rigidly mounted thereto, by an arm support, a plurality of press wheels for adjusting ground opening depth, said arm support attached to said parallel link system in a trailing position to said parallel link system, said press wheels being selectively changeable to different sizes;

f) said pairs of disc blades each having a reverse bevel on one of the disc blades of each said pair, said disc blades attached to drill arm supports, said drill arm supports connected to said parallel link system in a trailing position to said parallel link system and forward of said press wheels, said pairs of disc blades operative to form narrow angle between said disc blades of each said pair and produce a "V" shaped groove for seeding, said controllably adjustable mechanism operative to provide up to 14 inches of operating range as said pairs of disc blades rotate on the ground;

g) said plurality of parallel bars being mounted with an approximate 60 degree downward angle at the bottom of said opener range of travel and below a horizontally level angle at the top of the said opener range of travel;

h) said support frame when unfolded providing for parallel operation of said openers.

19. The grain drill unit as set forth in claim 18 wherein said seed boxes are connected to feed tubes that deliver said seeds and said fertilizers to said openers.

* * * * *